Patented Aug. 25, 1953

2,650,194

UNITED STATES PATENT OFFICE 2,650,194

WELL DRILLING COMPOSITION AND METHOD OF MANUFACTURE THEREOF

Henry W. Rahn, Corpus Christi, Tex., assignor to Columbia-Southern Chemical Corporation, a corporation of Delaware No Drawing. Application September 7, 1949, Serial No. 114,461

20 Claims. (Cl. 252—8.5)

This invention relates to a well treating composition suitable for use in well drilling fluids and it has particular relation to their application in drilling oil and gas wells.

A mud laden fluid is used in rotary drilling of oil and gas wells. The fluid is pumped down through the drill system to the bit and there issues to rise in the annular space between the drill stem and the walls of the bore-hole. The fluid serves several purposes. It carries cuttings and sand working in at the base up the bore-hole to settling areas where these cuttings and rock particles settle out. Gases coming from the bore-hole and entrained in the fluid bubble out in the settling areas. The fluid is then pumped back to the drill stem and the cycle is repeated.

Another function of the fluid is to cool and lubricate the bit. The fluid also seals the walls of the well thereby preventing undesirable seepage of gases and liquids into the bore-hole, loss of drilling fluid into the formation being drilled, and caving in of the formation.

The drilling fluid must be colloidal in order that enough clay particles can be maintained in suspension to impart to the mud a high density sufficient to produce adequate hydrostatic pressure. Also, the colloidal nature of the mud makes it more effective in plastering the walls of the bore-hole to seal off porous formations and to assist in carrying cuttings out of the hole. Too much colloidal material renders the fluid too viscous, thereby making it difficult to pump. On the other hand, fluids made from clays having a deficiency of colloidal material are improved by the addition of a highly colloidal clay, such as bentonite. It is desirable that the fluid possess thixotropic properties in order that the cuttings do not settle and clog the bore-hole in the event of temporary suspensions in drilling operations.

In addition, the drilling fluid sometimes must combat formations known as heaving shale. Heaving shale is believed to be caused by the hydration of shale particles with water from the ordinary drilling fluids. It is highly sensitive to water and highly colloidal. The shale swells, disintegrates, and flows into the bore-hole, often clogging the drilling tools.

Ordinary drilling fluids are created by using water as the liquid and combining it with the mud or clays from the bore and additional colloidal clays. These are the basic fluids used in drilling operations.

In United States Letters Patent No. 2,109,858 granted to G. E. Cannon a process of drilling has been described wherein aqueous sodium hydroxide and tannin are added to drilling mud or fluid. Addition of these agents are found to reduce the viscosity of the mud and to prevent its gelation.

A number of problems have arisen in connection with this process. Difficulty is encountered by the drilling crew in handling both quebracho and sodium hydroxide. Quebracho must be ground just prior to use and even a short time after grinding, the ground product absorbs water from the air and coalesces to a hard solid mass requiring regrinding. Alkali metal hydroxide frequently causes severe burns.

According to the present invention, a novel well treating composition and a novel method of producing such composition has been provided. This composition comprises alkali metal tannate, preferably a baked or partially oxidized alkali metal tannate, and alkali metal hydroxide and preferably contains a solid adsorbent which is substantially insoluble in water. This composition is much less harzardous to use and thus drilling crews using the composition are less subject to burns and like injuries. Furthermore, when this composition is used in the treatment of drilling fluids, the cost thereof is found to be much less than the cost normally encountered when sodium hydroxide and a tannin, such as quebracho are used. A further advantage which accrues when the composition contains a solid diluent, particularly when the solid is an adsorbent which is substantially insoluble in water, lies in the fact that the composition remains pulverulent or granular even under atmospheric conditions of high humidity, whereas quebracho or like tannin extract will coalesce under these conditions thus requiring grinding just prior to use.

The lower cost which is achieved through use of this composition appears to be due in part to the fact that the adsorbent or like solid serves effectively to hold and support the alkali metal tannate and alkali metal hydroxide and to control the rate of its release to the drilling fluid. Thus, while a certain amount of water is lost from the mud by percolation through the walls of the well, with consequent loss of caustic and tannate, the adsorbent tends to hold these materials and thus tends to reduce the amounts thereof lost in this manner.

Various solids may be used in conjunction with the alkali metal hydroxide and tannate. Most advantageously, these solids should be adsorbent and relatively insoluble in water (i. e.

have a solubility less than 1% by weight). Typical materials which are suitable include calcium carbonate (precipitated or ground), calcium hydroxide, barium carbonate, magnesium carbonate and other alkaline earth metal carbonates, or hydroxides, metal oxides and like oxides including zinc oxide, titanium dioxide, silica, calcium oxide, magnesium oxide, silicates such as precipitated calcium silicate, precipitated magnesium silicate or other alkaline earth metal silicate, bentonite clay, kaolin, montmorillonite, fuller's earth or like adsorbent clay, barium sulphate, calcium sulphate, natural barks and fibers, such as redwood bark, sawdust, complex calcium, magnesium or calcium magnesium phosphates, and other adsorbent compositions, including gas black, carbon black, lamp black, active carbon, silica flour, etc. These solids serve to maintain the composition in a pulverulent form and to prevent agglomeration of the composition into lumps, upon standing. Moreover, because of the adsorbent character of such solids, they retain the tannate-caustic mixture upon the surface thereof, ensuring uniformity of composition and restraining the rate of solution of the tannate-caustic so as to ensure supply thereof to the solution over a longer period of time. It is desirable that a preponderant amount, for example, 90 per cent by weight, of such solids have a particle size of less than 10 microns.

Other solids which aid in preventing agglomeration of the composition, but which would not possess all of the advantageous characteristics arising from use of adsorbents, may be used. Thus, sodium carbonate, potassium carbonate, and like water soluble materials may be used. However, since these materials dissolve in water, they do not serve as effectively to restrain the rate of solution of the sodium tannate-caustic.

The amount of these solids should be sufficient to effectively prevent lumping of the composition. Generally, the adsorbent or like solid should be at least 15–25 percent by weight of the alkali tannate and alkali metal hydroxide in the composition. Larger amounts are permissible, but the adsorbent or like material rarely exceeds twice the weight of the alkali metal hydroxide and alkali metal tannate in the composition.

According to a further embodiment, a particularly advantageous method of producing the contemplated tannate has been provided. This method ensures production of a product which is essentially uniform throughout, and which has the appearance of homogeneity to the naked eye.

According to this novel method, an aqueous solution of alkali metal tannate and alkali metal hydroxide is prepared, the adsorbent added, and the resulting slurry is dried to produce a dry composition. This drying is effected by using a conventional drum drier, tray drier or spray drier, and effecting the dehydration in air. During dehydration, some oxidation occurs as indicated by an increase in the number of carboxylic groups in the tannate molecule, and also by a slight carbonization. The final temperature of drying ranges from 250° to 650° F. Under such conditions, where no precautions are taken to exclude air, a small amount of oxidation or breakdown of the tannin molecule occurs, but this is not sufficient to decompose any appreciable amount of product and, primarily, the effect is to increase the carboxyl content of the tannate.

In performance of the process, a tannin concentrate or extract, such as quebracho extract, is dispersed in aqueous alkali metal hydroxide, and the adsorbent added. Thereupon, the mixture is dehydrated, as stated above.

The amount of alkali metal hydroxide used should be substantially in excess of the amount required to react with the tannin to produce a neutral product. In the case of quebracho extract and like extracts, 0.15 part by weight of NaOH will react with quebracho to produce a neutral product. In preparing the composition herein contemplated, at least 0.3 part by weight of NaOH is used per part of quebracho. Hence, the amount of NaOH or like alkali metal hydroxide used should be at least twice that required to react with the tannin to the point of neutrality. In general, the amount of alkali metal hydroxide used ranges from about ⅓ to 10 parts by weight per part of tannin or a tannin extract, such as quebracho extract. Hence, the amount of free alkali metal hydroxide in the ultimate product usually ranges from about .15 to 9.85 parts by weight per part of the sodium tannate.

In preparing the well treating composition of this invention, it is desirable to employ aqueous alkali-metal hydroxide solutions of concentrations at least 40 percent, generally 40 to 73 percent, by weight alkali-metal hydroxide in order that the final water content may be kept low. The final moisture content of the finished product should not be more than 15 percent by weight of the complete mixture, and preferably not more than 10 percent.

In order that the product may be easily used in the field, it is usually reduced to a particle size wherein a preponderant amount, for example, 90 percent of the total mass, can pass through a twenty mesh screen.

For a better understanding of the appearance of the product and a process of manufacturing the product, reference may now be had to the following examples:

*Example I*

Two hundred pounds of an aqueous sodium hydroxide solution, containing 50 percent by weight of NaOH, are placed in a cylindrical steel tank having a 20 inch inside diameter and provided with a gas burner for heating. This solution is then heated to 150° F. and 100 pounds of lump quebracho extract (commercial dry) having a particle size such as to pass a discharge screen with $\tfrac{3}{16}$ inch openings, is added slowly to the tank over a period of 15 minutes. The gas burner is extinguished when the temperature of the solution reaches 200° F. During the addition of the quebracho extract, the solution is stirred with a 10 inch propeller turning approximately 410 revolutions per minute. The final temperature of the solution is 250° F. after all the quebracho has been added.

The liquor thus prepared is removed from the tank and placed in steel trays measuring 30 inches by 28 inches by 2 inches. These trays are placed in an indirect gas fired tray drier and heated without exclusion of air for 12 hours at a temperature ranging from 320 to 460° F. The dry cake is ground in a hammer mill to pass a discharge screen with $\tfrac{3}{16}$ inch openings.

This product is a black or dark brownish granular composition which has the appearance of homogeneity to the naked eye. The product is found to have an increased carboxyl content over that which is present in a product obtained by simple mixing of quebracho and caustic in aqueous medium. This increase may be due to partial oxidation of the mixture during the drying operation, or it may be due to alteration or breaking up of the tannin molecule by the caustic, during baking.

*Example II*

Two hundred pounds of an aqueous sodium hydroxide solution, containing 50 percent by weight of NaOH, are placed in a cylindrical steel tank having a 20 inch inside diameter and provided with a gas burner for heating. This solution is then heated to 150° F. and 100 pounds of lump quebracho extract, having a particle size such as to pass a discharge screen with $\frac{3}{16}$ inch openings, is added slowly to the tank over a period of 15 minutes. The gas burner is extinguished when the temperature of the solution reaches 200° F. During the addition of the quebracho extract, the solution is stirred with a 10 inch propeller turning approximately 410 revolutions per minute. The final temperature of the solution is 250° F. after all of the quebracho has been added. Next, 50 pounds of a precipitated calcium carbonate aqueous slurry, containing 67 percent by weight of calcium carbonate, is added. The solution is agitated during addition of the calcium carbonate slurry.

The liquor thus prepared is removed from the tank and placed in trays which are heated in an indirect heater for 12 hours, without exclusion of air. Alternatively, the drying may be conducted using a drum drier. The product is in the form of a dry porous cake that falls from the trays when they are inverted. The final drying temperature is 400° F. and the moisture content of the final product is 7 percent by weight of the total product. The dry cake is then ground in a hammer mill to pass a discharge screen with $\frac{3}{16}$ inch openings, and packaged.

This product is similar in appearance to that described in Example I. Upon electrometric titration of this material, it was found that the composition indicated the presence of two weak acid groups having approximate acid ionization constants of $1.4 \times 10^{-9}$ and $9 \times 10^{-5}$, respectively. The number of equivalents formed from one mole of quebracho extract (mole wt.=2500) of the component having the acid ionization constant of $1.4 \times 10^{-9}$ was computed to be 7, while the number of equivalents of the component having the acid ionization constant of $9 \times 10^{-5}$ is 9.

From this and other data, it appears that, as a result of the baking, substituted phenols and aromatic acids are formed due to oxidation of trihydroxyflavanol units of the quebracho molecule and/or by splitting of ether linkage or opening of pyrane rings thereof. At all events, the baking results in a substantial change in the molecule, increasing the concentration of polar groups in the compound. Such increase serves to increase the affinity of the organic composition for clay or like solids in the drilling well, thus permitting use of less of the composition than would otherwise be required.

Other compositions which are desirable for use in the production of the well-treating compositions, and which may be prepared using aqueous alkaline solution and drying the composition as described in Example II, are as follows:

| | Parts by weight |
|---|---|
| Sodium hydroxide | 50 |
| Wattle bark | 80 |
| | |
| Sodium hydroxide | 100 |
| Redwood bark | 200 |
| | |
| Sodium hydroxide | 100 |
| Wattle bark | 150 |
| Calcium carbonate | 40 |
| | |
| Sodium hydroxide | 100 |
| Redwood bark | 200 |
| Calcium carbonate | 50 |
| | |
| Sodium hydroxide | 50 |
| Quebracho extract | 100 |
| Calcium carbonate | 17 |
| | |
| Sodium hydroxide | 100 |
| Quebracho extract | 100 |
| Sodium carbonate | 50 |
| | |
| Sodium hydroxide | 50 |
| Quebracho extract | 100 |
| Sodium carbonate | 17 |
| | |
| Sodium hydroxide | 100 |
| Quebracho extract | 100 |
| Silica flour | 50 |

Since redwood and like barks contain both tannin and fiber, further absorbent may or may not be needed, depending upon the mode of drying used.

It will be understood that a further composition may be prepared according to this invention by mixing in dry state, a tannin such as anhydrous quebracho extract, and flake sodium hydroxide, together with or without the adsorbent in the proportions set forth above. This mixture may be ball milled to produce an intimate mixture. Such product is different in composition and appearance from the baked composition herein disclosed, but is useful as a well-treating composition.

While the invention has been described with particular reference to use of sodium hydroxide, it is to be understood that potassium hydroxide, lithium hydroxide, and like hydroxides may be used in lieu thereof.

While the organic compound set forth in the examples is quebracho, other tannins, tannin extracts or tannin-containing materials, such as tannic acid or other vegetable extracts rich in tannin, including pistachio, sumac, minibari, celery pine, archil, cutch, quercitron, wattle, mimosa, divi divi, fustic, oak, osage, orange, hickory, gambier, haematine, mangrove, logwood, myrobalans, redwood, sodium palconate, spruce, hypernic hemlock, tarnwood, cascalote, etc. may be used. Tannin obtained from calcium and sodium lignosulfonates and kraft paper mill black liquor, has been used successfully; likewise, various earths containing humic acids, such as lignin shale.

Although the present invention has been described with reference to specific details of certain embodiments thereof, it is not intended that such details shall be regarded as limitations upon the scope of the invention except insofar as included in the accompanying claims.

The term "consisting essentially of" which appears in any of the claims hereof is intended to refer to a composition in which the total amount of the components set forth in the claim constitutes the predominant proportion in the composition. Such term is not intended to exclude the presence of materials such as moisture or water or other material which serves either as an inert diluent or at least does not adversely affect the well-treating properties of the composition. However, the term is intended to exclude the presence of materials which so change the character of the composition that it no longer can be regarded as a suitable well-treating agent.

I claim:

1. A solid granular well-treating composition produced by heating an aqueous liquid mixture of an alkali metal hydroxide and a tannin at a temperature of 250 to 650° F., until a solid reaction product has been obtained, the amount of alkali metal hydroxide in said composition being substantially in excess of that required to react with the tannin to produce a neutral product.

2. The product of claim 1 wherein the tannin is mangrove tannin.

3. A solid granular well-treating composition produced by heating an aqueous liquid mixture of sodium hydroxide and a tannin at a temperature of 250 to 650° F. until a solid reaction product has been obtained, the amount of sodium hydroxide in said composition being substantially in excess of that required to react with the tannin to produce a neutral product.

4. A solid granular well-treating composition produced by heating an aqueous liquid mixture of sodium hydroxide, a tannin, and a solid adsorbent at a temperature of 250 to 650° F. until a solid reaction product has been obtained, the amount of sodium hydroxide in said composition being substantially in excess of that required to react with the tannin to produce a neutral product.

5. The well-treating composition of claim 4 wherein the adsorbent is a member of the group consisting of the alkaline earth metal carbonates and hydroxides.

6. A method of preparing a composition which comprises forming an aqueous dispersion of tannin and an amount of alkali metal hydroxide substantially in excess of the amount required to react with the tannin to produce a neutral product, and heating the resulting mixture to a temperature of 250 to 650° F. to obtain a solid product.

7. A method of preparing a composition which comprises forming an aqueous dispersion of tannin, an amount of sodium hydroxide substantially in excess of that which will react with the tannin to produce a neutral product, and a solid adsorbent which is substantially insoluble in water, and heating the resulting mixture at a temperature of 250 to 650° F. to vaporize water therefrom and to obtain a solid product.

8. A solid granular well-treating composition which consists essentially of the reaction product of sodium tannate, 1/6 to 10 parts by weight of sodium hydroxide based upon the weight of sodium tannate, and 15 to 200 per cent by weight of a solid adsorbent based upon the weight of the tannate and the hydroxide, said reaction product having been produced by heating an aqueous liquid mixture of the hydroxide, the tannate, and the adsorbent at a temperature of 250 to 650° F. until a solid product has been obtained.

9. A method of preparing a composition which comprises mixing 0.3 to 10 parts by weight of aqueous sodium hydroxide with 1 part by weight of quebracho extract, and a solid adsorbent which is substantially insoluble in water in amount 15 to 200 percent by weight of the hydroxide and the extract, and drying the product at 250 to 650° F.

10. The process of claim 9 wherein the adsorbent is calcium carbonate.

11. The composition of claim 8 wherein the adsorbent is calcium carbonate.

12. The composition of claim 8 wherein the tannin is quebracho extract.

13. A well-treating composition which consists essentially of a tannin, 1/3 to 10 parts of sodium hydroxide based upon the weight of the tannin, said sodium hydroxide being in the form of aqueous sodium hydroxide containing up to 73 percent by weight of alkali metal hydroxide, said composition having been at least partially dehydrated by heating to a temperature of 250 to 650° F. to vaporize water therefrom and to obtain a solid product, the amount of sodium hydroxide in said composition being substantially in excess of that required to react with the tannin to produce a neutral product.

14. A well-treating composition which consists essentially of a tannin, 1/3 to 10 parts of sodium hydroxide based upon the weight of the tannin, and 15 to 200 percent of an inert adsorbent which is insoluble in water, based upon the weight of tannin and sodium hydroxide, said sodium hydroxide being in the form of aqueous sodium hydroxide containing up to 73 percent by weight of alkali metal hydroxide, said composition having been at least partially dehydrated by heating to a temperature of 250 to 650° F. to vaporize water therefrom and to obtain a solid product, the amount of sodium hydroxide in said composition being substantially in excess of that required to react with the tannin to produce a neutral product.

15. A method of preparing a well-treating composition, which comprises mixing a tannin, 1/3 to 10 parts of sodium hydroxide based upon the weight of the tannin, said sodium hydroxide being in the form of aqueous sodium hydroxide containing up to 73 percent by weight of alkali metal hydroxide, and at least partially dehydrating the resulting mixture by heating to a temperature of 250 to 650° F. to vaporize water therefrom and to obtain a solid product.

16. The method of claim 15 wherein the mixture is heated at about 150–250° F. prior to heating to dryness.

17. The process of claim 16 wherein the tannin is mangrove tannin.

18. A method of preparing a well-treating composition, which comprises mixing a tannin, 1/3 to 10 parts of sodium hydroxide based upon the weight of the tannin, and 15 to 200 percent of an inert adsorbent which is insoluble in water, based upon the weight of tannin and sodium hydroxide, said sodium hydroxide being in the form of aqueous sodium hydroxide containing up to 73 percent by weight of alkali metal hydroxide, and at least partially dehydrating the resulting mixture by heating it to a temperature of 250 to 650° F. to vaporize water therefrom and to obtain a solid product.

19. The composition of claim 14 wherein the adsorbent is calcium carbonate.

20. In a process for drilling a well with well drilling tools wherein there is circulated a water base drilling mud containing clayey material suspended in sufficient water to render the same circulatable, the method which comprises admixing with said mud and interacting therewith the composition defined by claim 1 in an amount sufficient to adjust the viscosity of the mud and to maintain the mud in a circulatable state and circulating the resulting mud through the well during drilling thereof.

HENRY W. RAHN.

References Cited in the file of this patent

UNITED STATES PATENTS

| Number | Name | Date |
|---|---|---|
| 411,320 | Boogher | Sept. 17, 1889 |
| 958,893 | Ridenour | May 24, 1910 |
| 1,999,766 | Lawton et al. | Apr. 30, 1935 |
| 2,109,858 | Cannon | Mar. 1, 1938 |
| 2,220,950 | Bird | Nov. 12, 1940 |
| 2,376,885 | Sherwood | May 29, 1945 |
| 2,393,269 | Rudolfs et al. | Jan. 22, 1946 |
| 2,560,930 | Campise | July 17, 1951 |

OTHER REFERENCES

Rogers: Composition and Properties of Oil Well Drilling Fluids; 1st ed.; pub., 1948, Gulf Pub. Co., Houston, Texas, pp. 291–2.